United States Patent
Ye et al.

(10) Patent No.: US 12,194,840 B2
(45) Date of Patent: Jan. 14, 2025

(54) VEHICLE POWER TRANSMISSION SYSTEM AND VEHICLE POWER SYSTEM

(71) Applicants: WUXI INFIMOTION PROPULSION TECHNOLOGY CO., LTD., Wuxi (CN); WUXI INFIMOTION TECHNOLOGY CO., LTD., Wuxi (CN)

(72) Inventors: Guanghai Ye, Hangzhou (CN); Yuting Zhao, Hangzhou (CN); Shijun Chen, Hangzhou (CN); Wenbo Yao, Hangzhou (CN); Youdi Shi, Hangzhou (CN); Shiquan Gou, Hangzhou (CN); Yanjun Tan, Hangzhou (CN); Xiaozhe Lin, Hangzhou (CN)

(73) Assignees: WUXI INFIMOTION PROPULSION TECHNOLOGY CO., LTD., Wuxi (CN); WUXI INFIMOTION TECHNOLOGY CO., LTD., Wuxi (CN)

( * ) Notice: Subject to any disclaimer, the term of this patent is extended or adjusted under 35 U.S.C. 154(b) by 246 days.

(21) Appl. No.: 17/876,233

(22) Filed: Jul. 28, 2022

(65) Prior Publication Data
US 2023/0264566 A1   Aug. 24, 2023

Related U.S. Application Data

(63) Continuation of application No. PCT/CN2022/093642, filed on May 18, 2022.

(30) Foreign Application Priority Data

Feb. 21, 2022 (CN) .......... 202210159507.6

(51) Int. Cl.
   B60K 17/04 (2006.01)
   B60K 1/02 (2006.01)
   F16H 57/021 (2012.01)

(52) U.S. Cl.
   CPC ............ *B60K 17/04* (2013.01); *B60K 1/02* (2013.01); *F16H 57/021* (2013.01)

(58) Field of Classification Search
   CPC ........ B60K 1/02; B60K 17/12; B60K 7/0007; B60K 2007/0061; B60K 17/145; B60K 17/043; B60K 17/04
   See application file for complete search history.

(56) References Cited

U.S. PATENT DOCUMENTS 8,336,655 B2 * 12/2012 Knoblauch .......... B60K 7/0007
                                                        477/3
10,895,320 B2 * 1/2021 Suyama ................ F16H 48/10
(Continued)

FOREIGN PATENT DOCUMENTS

CN    109318697 A     2/2019
CN    110091700 A  *  8/2019  ............... B60K 1/02
(Continued)

OTHER PUBLICATIONS

Notice of Reasons for Refusal issued in counterpart Japanese Patent Application No. JP 2022-547858, dated Oct. 27, 2023.
(Continued)

*Primary Examiner* — Sherry L Estremsky
(74) *Attorney, Agent, or Firm* — Westbridge IP LLC

(57) ABSTRACT

Disclosed are a vehicle power transmission system and a vehicle power system. The vehicle power transmission system includes two motor output shafts, two power output shafts and two transmission mechanisms respectively connected between the two motor output shafts and the two power output shafts correspondingly. Each transmission
(Continued)

mechanism includes a motor output gear, a power output gear and a middle transmission gear structure. The motor output gear is arranged on a motor output shaft, and the power output gear is arranged on a power output shaft. The middle transmission gear structure is in transmission connection with the motor output gear and the power output gear. The two power output shafts extend in a first direction, along the first direction, projections of the two motor output shafts are at least partially overlapped and/or projections of the two transmission mechanisms are at least partially overlapped.

12 Claims, 6 Drawing Sheets

(56) References Cited

U.S. PATENT DOCUMENTS

| | | | |
|---|---|---|---|
| 11,192,448 | B2 * | 12/2021 | Mepham ............... B60K 1/00 |
| 2008/0230284 | A1 | 9/2008 | Schoon |
| 2021/0046819 | A1 | 2/2021 | Yu et al. |
| 2021/0380078 | A1 | 12/2021 | Plow et al. |

FOREIGN PATENT DOCUMENTS

| | | | | |
|---|---|---|---|---|
| CN | 212455431 | U | 2/2021 | |
| CN | 113513572 | A | 10/2021 | |
| CN | 215284326 | U | 12/2021 | |
| CN | 113910882 | A | 1/2022 | |
| CN | 114290885 | A | 4/2022 | |
| DE | 102019134454 | A1 | 6/2020 | |
| DE | 102021206732 | A1 | 12/2022 | |
| EP | 3663118 | A1 * | 6/2020 | |
| EP | 3919304 | A1 * | 12/2021 | ............... B60K 1/02 |
| FR | 3053007 | A1 | 12/2017 | |
| JP | 2013108604 | A | 6/2013 | |
| JP | 2015506862 | A | 3/2015 | |
| JP | 2019158119 | A | 9/2019 | |
| JP | 2020143715 | A | 9/2020 | |
| JP | 2021175657 | A | 11/2021 | |
| KR | 1020100023345 | A | 3/2010 | |
| WO | 2017211793 | A1 | 12/2017 | |
| WO | WO-2021005186 | A1 * | 1/2021 | ............... B60K 1/02 |

OTHER PUBLICATIONS

Request for the Submission of an Opinion issued in counterpart Korean Patent Application No. KR 10-2022-7029018, dated Dec. 13, 2023.
European Search Report issued in counterpart European Patent Application No. EP 22738525.9, dated Mar. 27, 2024.
Notice of Reasons for Refusal issued in counterpart Japanese Patent Application No. JP 2022-547858, dated Apr. 2, 2024.
International Search Report and Written Opinion issued in corresponding PCT Application No. PCT/CN2022/093642, dated Aug. 25, 2022.
Decision to Grant a Patent issued in counterpart Japanese Patent Application No. JP 2022-547858, dated Oct. 1, 2024.
Written Decision on Registration issued in counterpart Korean Patent Application No. KR 10-2022-7029018, dated Sep. 26, 2024.

* cited by examiner

VEHICLE POWER TRANSMISSION SYSTEM AND VEHICLE POWER SYSTEM

CROSS-REFERENCE TO RELATED APPLICATIONS

This application is a continuation application of International Patent Application No. PCT/CN2022/093642, filed on May 18, 2022, which claims priority to Chinese Patent Application No. 202210159507.6, filed on Feb. 21, 2022. The disclosures of the aforementioned application are incorporated in this application by reference in its entirety.

TECHNICAL FIELD

The present application relates to the field of automobiles, in particular to a vehicle power transmission system and a vehicle power system.

BACKGROUND

At present, with the development of new energy vehicle industries, electric vehicles have become a trend. The performance of the electric vehicle attracts more and more attention. Limited by the motor, the volume and weight of the current motor are increased significantly when the motor has high power, which limits the development of high performance electric vehicles. Furthermore, as the consumers pay more attention to the performance, the demand for power configurations such as vector control, differential lock and the like is increasing daily. In order to ensure that the transmission system can achieve functions such as differential speed, differential lock and vector control, additional mechanical mechanisms (e.g., a speed reduction mechanism, a differential mechanism, and a vector adjustment mechanism, etc.) need to be provided in the transmission system, which increases the volume and weight of the transmission system, and results in more energy consumption of the vehicle.

SUMMARY

The main object of the present application is to provide a vehicle power transmission system and a vehicle power system, which aim to solve the problem of large volume of an existing vehicle power system.

In order to achieve the above object, a vehicle power transmission system provided by the present application includes two motor output shafts, two power output shafts and two transmission mechanisms respectively connected between the two motor output shafts and the two power output shafts correspondingly, each transmission mechanism includes a motor output gear, a power output gear and an middle transmission gear structure, the motor output gear is arranged on a corresponding motor output shaft, and the power output gear is arranged on the corresponding power output shaft, the middle transmission gear structure is in transmission connection with the motor output gear and the power output gear, and the two power output shafts are extended in a first direction, along the first direction, projections of the two motor output shafts are overlapped; and/or projections of the two transmission mechanisms are overlapped.

In an embodiment, the two motor output shafts are arranged coaxially and opposite to each other in the first direction;

the two middle transmission gear structures are overlapped, each middle transmission gear structure including a middle shaft, a middle input gear and a middle output gear, the middle input gear being synchronous with the middle output gear through the middle shaft;

two middle shafts are arranged in parallel with the two motor output shafts;

projections of two middle shafts are overlapped along a direction from the two motor output shaft to the two power output shafts;

projections of two middle input gears are overlapped along an extending direction of the middle shafts; and the middle input gear and the middle output gear of one of the transmission mechanisms are located on a same side along the first direction, and the middle input gear and the middle output gear of the other of the transmission mechanisms are located on another same side along the first direction.

In an embodiment, the two motor output shafts are arranged coaxially and opposite to each other in the first direction;

the two middle transmission gear structures are overlapped, each of the middle transmission gear structures including an middle shaft, an middle input gear and an middle output gear, the middle input gear and the middle output gear being rotated synchronously through the middle shaft;

the two middle shafts are arranged in parallel with the two motor output shafts;

projections of two middle shafts are overlapped along a direction from the two motor output shaft to the two power output shafts;

projections of two middle input gears are overlapped along an extending direction of the middle shaft; and the middle input gear of one of the transmission mechanisms and the middle output gear of the other of the transmission mechanisms are located on a same side along the first direction.

In an embodiment, the middle shaft is of a split structure, a first portion of the middle shaft is integrally formed with the middle input gear, a second portion of the middle shaft is integrally formed with the middle output gear, and the first portion of the middle shaft is connected to the second portion of the middle shaft through a spline.

In an embodiment, the two motor output shafts are arranged coaxially and opposite to each other along the first direction;

the two middle transmission gear structures are overlapped, each of the middle transmission gear structures including an middle shaft, an middle input gear and an middle output gear, the middle input gear and the middle output gear being rotated synchronously through the middle shaft;

two middle shafts are coaxially nested and include a first middle shaft and a second middle shaft, the first middle shaft is provided with a through hole, and an end of the second middle shaft is received in the through hole, two middle input gears include a first middle input gear and a second middle input gear, and two middle output gears include a first middle output gear and a second middle output gear, the first middle input gear and the first middle output gear are connected through the first middle shaft to rotate synchronously, and the second middle input gear and the second middle output gear are connected through the second middle shaft to rotate synchronously.

In an embodiment, the first middle input gear and the first middle output gear are located between the second middle input gear and the second middle output gear;
- a needle bearing is provided between the first middle shaft and the second middle shaft;
- a first thrust bearing is provided between the first middle input gear and the second middle shaft or the second middle output gear; and
- a second thrust bearing is provided between the first middle output gear and the second middle shaft or the second middle input gear.

In an embodiment, the first middle input gear and the first middle output gear are located in a first part on one side of the second middle shaft along the first direction, the second middle output gear and the second middle input gear are located in a second part on another side of the second middle shaft along the first direction, a first thrust bearing is provided between the first middle input gear and the second middle shaft, a second thrust bearing is provided between the first middle output gear and the second middle shaft, or between the second middle output gear and the second middle shaft.

In an embodiment, the two motor output shafts are perpendicular to a second direction, the first direction is perpendicular to the second direction. The two motor output shafts are located at the same side of the two transmission mechanisms. Two middle shafts and two power output shafts are located between the two motor output shafts along the second direction, two middle shafts are parallel along the first direction, axes of the two power output shafts are coaxial, and the two power output gears are opposite to each other.

In an embodiment, the vehicle power transmission system further includes a housing;
- at least one of the transmission gears includes at least one set of nesting structure, the nesting structure includes a supporting portion, a nesting bearing and a transmission gear, the transmission gear is at least one of the motor output gears, the power output gears, the middle output gears and the middle input gears, the transmission gear is provided with a mounting cavity, at least a portion of the nesting bearing is located in the mounting cavity, the transmission gear is supported on the supporting portion through the nesting bearing, and the supporting portion is a protruding portion of the housing or the supporting portion is fixedly connected to the housing.

In an embodiment, at least one group of the two motor output shafts, the two power output shafts, and the two middle shafts are arranged coaxially and opposite to each other, At least a gear at an end of one of coaxial shafts is provided with a first mounting cavity, the transmission system includes a first bearing, at least a portion of the first bearing is located in the first mounting cavity, and an end of another of the coaxial shafts is supported by the first bearing.

In addition, the present application relates to a vehicle power system, which includes:
- a vehicle power transmission system includes two motor output shafts, two power output shafts, and two transmission mechanisms respectively connected between the two motor output shafts and the two power output shafts correspondingly, where each transmission mechanism includes a motor output gear, a power output gear and an middle transmission gear structure, the motor output gear is arranged on a corresponding motor output shaft, and the power output gear is arranged on the corresponding power output shaft, the middle transmission gear structure is in transmission connection with the motor output gear and the power output gear, and the two power output shafts are extended in a first direction, along the first direction, projections of the two motor output shafts are overlapped, and/or projections of the two transmission mechanisms are overlapped; and
- driving motors connected to the motor output shafts or the motor output shafts being output shafts of the driving motors.

In the embodiments of the present application, the vehicle power transmission system includes two motor output shafts, two power output shafts, and two transmission mechanisms respectively connected between the two motor output shafts and the two power output shafts correspondingly. In this way, the two driving motors provide power individually and do not affect each other. When a differential function or vector control needs to be carried out, only the output speeds of the two driving motors need to be adjusted. At the same time, the projections of the two motor output shafts in a first direction are overlapped and arranged. and the projections of the two transmission mechanisms in the first direction are overlapped. By this way, the volume of the vehicle power system can be further reduced. The volume of the vehicle power system is smaller, and the structure is more compact.

BRIEF DESCRIPTION OF THE DRAWINGS

In order to more clearly explain the embodiments of the present application or the technical solutions in the related art, the drawings used in the description of the embodiments or the related art will be briefly introduced below. Obviously, the drawings in the following description are merely some embodiments of the present application. For those of ordinary skill in the art, other drawings can be obtained based on the structure shown in these drawings without creative work.

Figure 1:
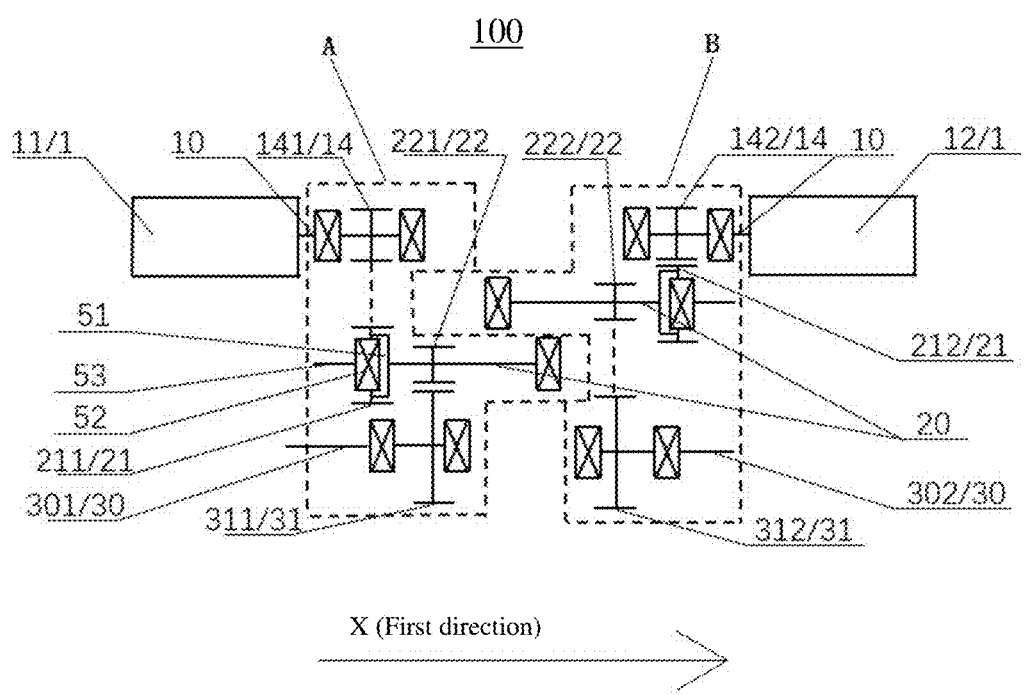
FIG. 1 is a schematic structural diagram of a vehicle power system according to an embodiment of the present disclosure.

The realization of the purposes, functional features and advantages of the present application will be further explained with reference to the accompanying drawings in combination with the embodiments.

DETAILED DESCRIPTION OF THE EMBODIMENTS

In the following, the embodiments of the present application will be clearly and completely described with reference to the drawings in the embodiments of the present application. Obviously, the described embodiments are only some of the embodiments of the present application, and not all of the embodiments. Based on the embodiments of the present application, all other embodiments obtained by those of ordinary skilled in the art without creative efforts shall fall within the claimed scope of the present application.

It should be noted that all directional indicators (such as up, down, left, right, front, back, etc.) in the embodiments of the present application are only used to explain the relative positional relationship, movement situation, etc. between components in a specific attitude (as shown in the drawings). If the specific attitude changes, the directional indication also changes accordingly.

In addition, the descriptions related to "first", "second" and the like in the present application are for descriptive purposes only, and should not be understood as indicating or implying their relative importance or implicitly indicating the number of technical features indicated. Therefore, a feature defined by "first" and "second" may explicitly or implicitly include at least one of such feature. In addition, the meaning of "and/or" in the full text includes three parallel solutions, taking "A and/or B" as an example, it includes solution A, solution B, or both solutions A and B. The various embodiments can be combined with each other, but the combination must be based on what can be achieved by those of ordinary skill in the art. When the combination of the embodiments is contradictory or cannot be achieved, it should be considered that such a combination does not exist, or is not within the scope of the claims of the present application.

At present, with the development of new energy vehicle industries, electric vehicles have become a trend. The performance of the electric vehicle attracts more and more attention. Limited by the motor, the volume and weight of the current motor are increased significantly when the motor has high power, which limits the development of high performance electric vehicles. Furthermore, as the consumers pay more attention to the performance, the demand for power configurations such as vector control, differential lock and the like is increasing daily. In order to ensure that the transmission system can achieve functions such as differential speed, differential lock and vector control, additional mechanical mechanisms (e.g., a speed reduction mechanism, a differential mechanism, and a vector adjustment mechanism, etc.) need to be provided in the transmission system, which increases the volume and weight of the transmission system, and results in more energy consumption of the vehicle.

In view of this, the present application provides a vehicle power system, and FIG. 1 to FIG. 9 are some embodiments of the vehicle power system provided by the present application. In the following the vehicle power system is described with reference to specific drawings.

Figure 2:
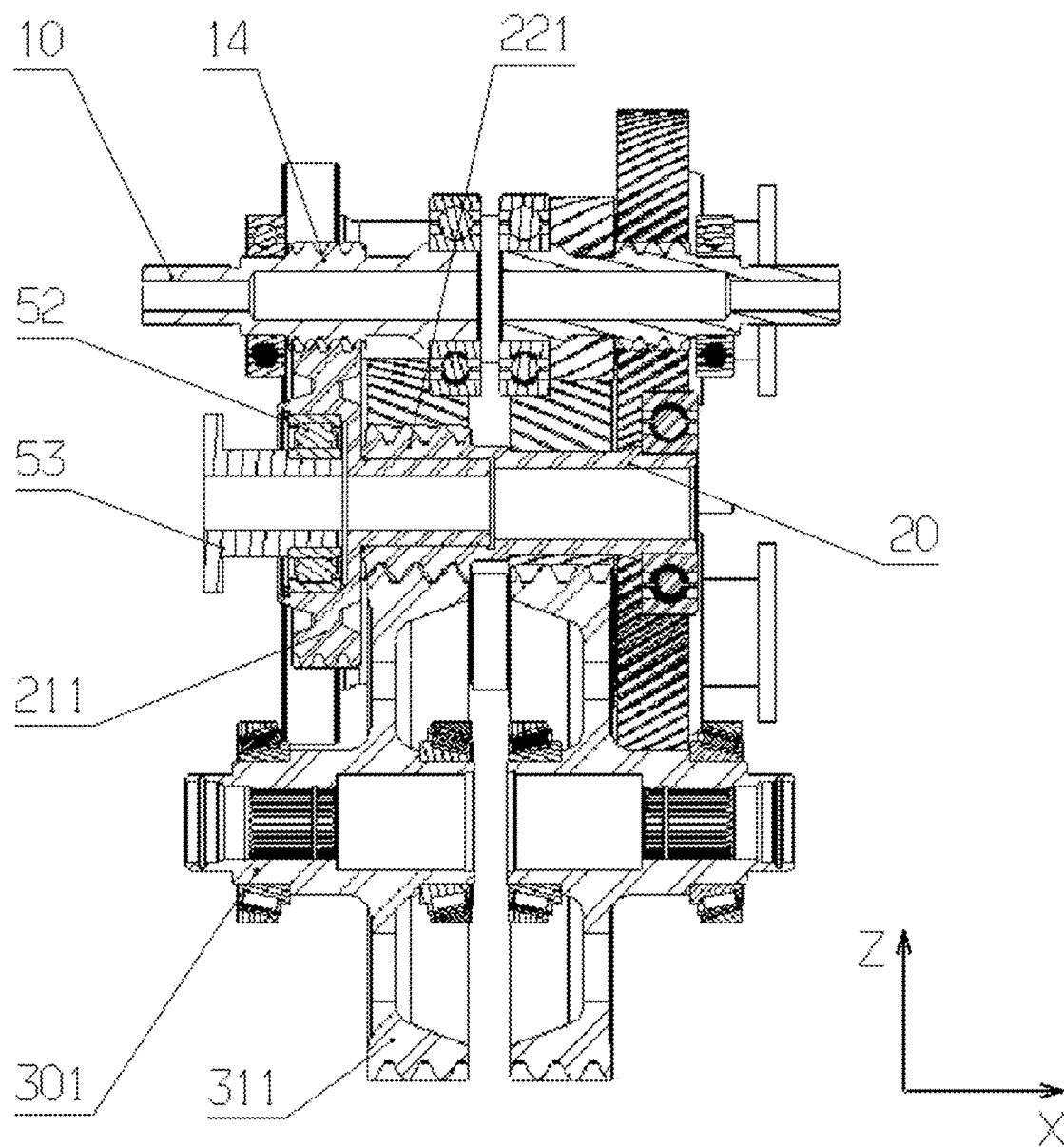
FIG. 2 is a schematic cross-sectional view of the vehicle power system of FIG. 1.
Figure 3:
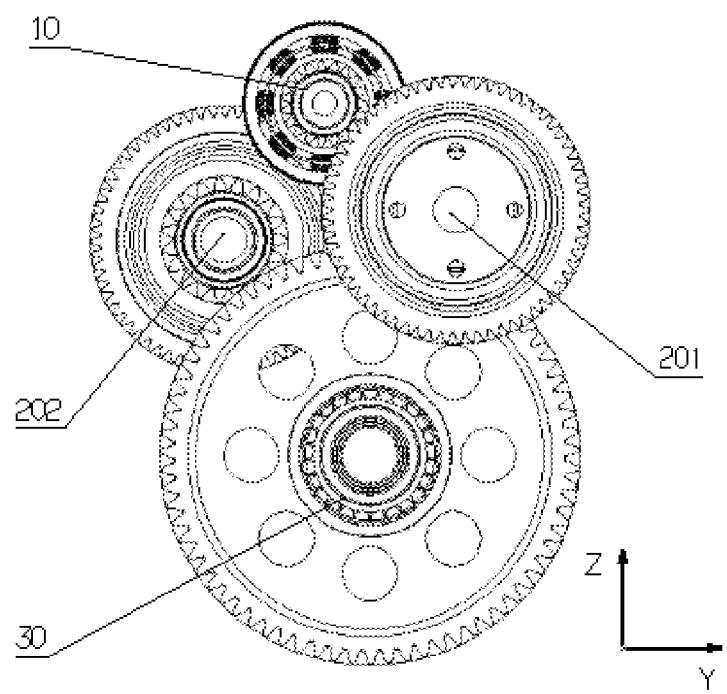
FIG. 3 is a structural schematic view of an end surface showing a meshing relationship of the vehicle power system in FIG. 2.

Referring to FIG. 1 to FIG. 3, the vehicle power system 100 includes a vehicle power transmission system and a driving motor 1. The driving motor 1 is connected to a motor output shaft 10 of the power transmission system, or the motor output shaft 10 of the power transmission system is also an output shaft of the driving motor. The vehicle power transmission system includes two motor output shafts 10, two power output shafts 30, and two transmission mechanisms respectively connected between the two motor output shafts 10 and the two power output shafts 30 correspondingly. Each transmission mechanism includes a motor output gear 14, a power output gear 31 and a middle transmission gear structure. The motor output gear 14 is arranged on the motor output shaft 10 and the power output gear 31 is arranged on the power output shaft 30. The middle transmission gear structure is in transmission connection with both the motor output gear 14 and the power output gear 31. The two power output shafts 30 are extended along a first direction. The first direction is a direction of the X axis in this embodiment. Projections of the two motor output shafts 10 along the X axis are overlapped; and/or projections of the two transmission mechanisms along the X axis are at least partially overlapped.

In this embodiment of the present application, the vehicle power transmission system includes two motor output shafts 10, two power output shafts 30, and two transmission mechanisms respectively connected between the two motor output shafts 10 and the two power output shafts 30 correspondingly. In this way, the two driving motors 1 provide power individually and do not affect each other. When a differential function or vector control needs to be carried out, only the output speeds of the two driving motors 1 need to be adjusted. At the same time, the two power output shafts 30 are extended along the X axis, and the projections of the two motor output shafts 10 along the X axis are at least partially overlapped and arranged, and the projections of the two transmission mechanisms along the X axis are at least partially overlapped. By this way, the volume of the vehicle power system 100 can be further reduced. The volume of the vehicle power system 100 is smaller, and the structure is more compact.

It should be noted that, in the present application, the driving forces of the two driving motors 1 are output through the two motor output shafts 10. The two motor output gears 14 rotate with the two motor output shafts 10 synchronously. The two motor output gears 14 are engaged with the two middle input gears 21 correspondingly, and the two middle output gears 22 synchronize respectively with the two middle input gears 21 through two middle shafts 20. The two middle output gears 22 are engaged with the two power output gears 31 correspondingly, and the two power output shafts 30 synchronize respectively with the power output gears 31. The two power output shafts 31 respectively drive external loads connected to a vehicle. The external loads of the vehicle are a left wheel and a right wheel of the vehicle.

In this embodiment, one of the driving motors 1 transmits power to one of the transmission mechanisms, one of the transmission mechanisms transmits the power to one of the power output shafts 30, and one of the power output shafts 30 transmits the power to the left wheel of the vehicle. The other one of the driving motors 1 transmits power to the other one of the transmission mechanisms, the other one of the transmission mechanisms transmit the power to the other one of the power output shafts 30, and the other one of the power output shafts 30 transmits the power to the right wheel of the vehicle. During the transmission process, the power transmission processes on both sides are independent from each other. Therefore, through the above structure, the differential speed control, the differential lock function and the vector control can be realized. Therefore, the vehicle power system 100 does not need additional deceleration mechanisms, addition differential speed mechanisms and addition vector control mechanisms to realize the differential speed control, the differential lock function and the vector control. Therefore the overall volume and weight of the vehicle power system 100 are reduced, the structure is more compact, and the overall power density is improved.

When the vehicle is in a stable driving process, the rotating speeds of the two driving motors 1 are the same. The rotating speeds transmitted to the left wheel and the right wheel of the vehicle are the same, and the vehicle moves straight ahead stably. When the vehicle needs a turning, in order to prevent the wheels from slipping, the rotating speeds of the left wheel and the right wheel need to be controlled to be different. At this time, only the rotating speed of a corresponding driving motor 1 needs to be controlled according to a direction of turning of the vehicle. Thus the differential speed function and the vector control function can be realized.

For ease of description, in the present application, the two driving motors 1 are referred as a first driving motor 11 and a second driving motor 12, the two middle shafts 20 are referred as a first middle shaft 201 and a second middle shaft 202, the two motor output shafts 10 are referred as a first motor output shaft and a second motor output shaft, the two motor output gears 14 are referred as a first motor output gear 141 and a second motor output gear 142, the two middle input gears 21 are referred as a first middle input gear 211 and a second middle input gear 212, the two middle output gears 22 are referred as a first middle output gear 221 and a second middle output gear 222, the two power output shafts 30 are referred as a first power output shaft 301 and a second power output shaft 302, and the two power output gears 31 are referred as a first power output gear 311 and a second power output gear 312. Those defined with the "first" belong to one power transmission chain and those defined with the "second" belong to another power transmission chain.

Referring to FIG. 1 to FIG. 3, in order to reduce the volume of the two transmission mechanisms, the two motor output shafts 10 have a same axis and are opposite to each other in the X axis, and the middle transmission gear structures are overlapped. Specifically, each middle transmission gear structures includes a middle shaft 20, a middle input gear 21 and a middle output gear 22. The middle input gear 21 and the middle output gear 22 rotate synchronously through the middle shaft 20. Both the middle shafts 20 are arranged in parallel with the motor output shafts 10. Along a direction from the motor output shafts 10 to the power output shafts 30, namely along a second direction which is a direction of the Z axis in this embodiment, the Z axis is perpendicular to the X axis. The X axis, the Y axis and the Z axis form a coordinate system. As shown in FIG. 2, at least portions of the projections of the middle shafts 20 are overlapped along an extending direction of the middle shafts 20. As shown in FIG. 3, portions of the projections of the middle input gears 21 are overlapped. In one embodiment, as shown in FIG. 2, a first portion of each middle shaft is integrally formed with the corresponding middle input gear 21, a second portion of each middle shaft is integrally formed with the corresponding middle output gear 22, and the first portion of the middle shaft is connected to the second portion of the middle shaft through a spline. Of course, the middle input gear, the middle shaft and the middle output gear may be integrally formed. Along the X axis, the vehicle power system 100 is divided into two equal parts: a first part and a second part. The middle input gear and the middle output gear of one of the transmission mechanisms are located on a same side such as located in the first part long the X axis, and the middle input gear and the middle output gear of the other of the transmission mechanisms are located on the other same side such as located in the second part along the X axis. Further, as shown in FIG. 1 and FIG. 2, along the X axis, the first input gear 211 and the first output gear 221 of the first transmission mechanism are located in the first part on the left side, and the second input gear 212 and the second output gear 222 of the second transmission mechanism are located in the second part on the right side. In this way, the first transmission mechanism and the second transmission mechanism are symmetrically arranged, which is beneficial not only to the stability of the system, but also to the reduction of the volume of the vehicle power system 100 to some extent.

Figure 4:
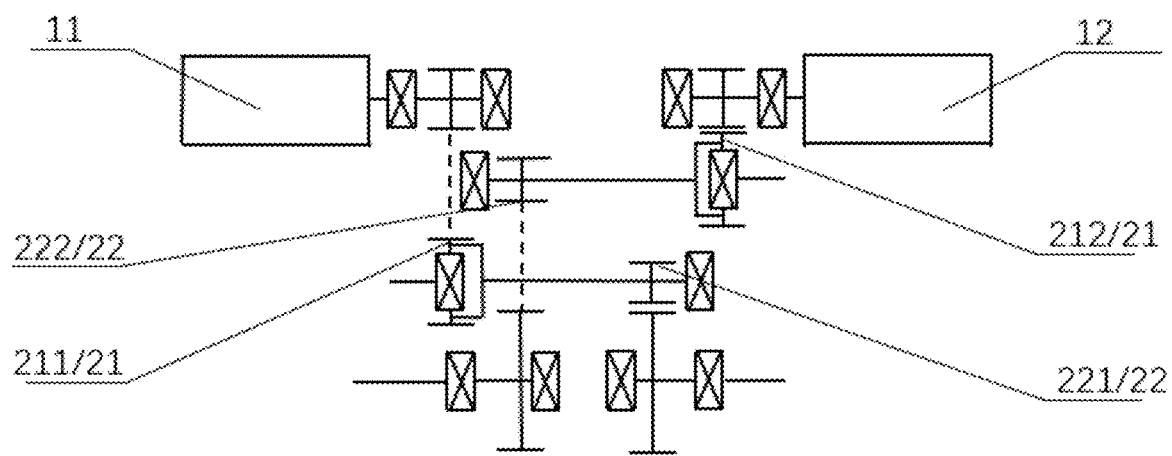
FIG. 4 is a schematic structural diagram of the vehicle power system according to another embodiment of the present disclosure.
Figure 5:
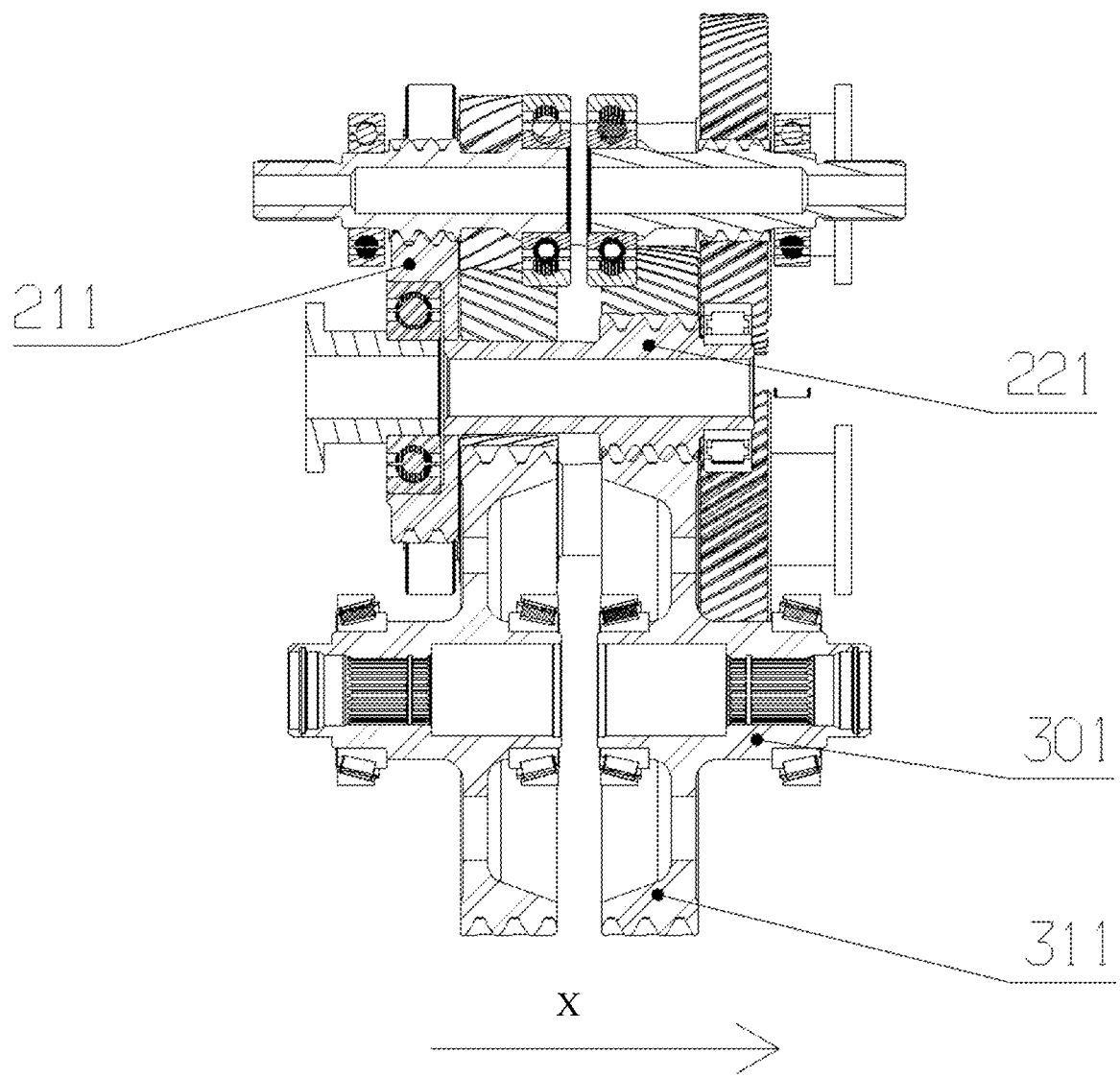
FIG. 5 is a schematic cross-sectional view of the vehicle power system of FIG. 4.

Referring to FIG. 4 and FIG. 5, the two motor output shafts 10 are arranged opposite to each other along the X axis. The middle transmission gear structures are overlapped. The middle transmission gear structure includes a middle shaft 20, a middle input gear 21 and a middle output gear 22. The middle input gear 21 and the middle output gear 22 rotate synchronously through the middle shaft 20. Both the middle shafts 20 are arranged in parallel with the motor output shafts 14. As shown in FIG. 5, along a direction from the motor output shafts 10 to the power output shafts 30, at least portions of the projections of the middle shafts 20 are overlapped. As shown in FIG. 3, along the extending direction of the middle shafts 20, portions of the projections of the two middle input gears are overlapped. Each middle shaft is of a split structure, a first portion of the middle shaft is integrally formed with the middle input gear, and a second portion of the middle shaft is integrally formed with the middle output gear. The first portion of the middle shaft is connected to the second portion of the middle shaft through a spline. Of course, the middle input gear, the middle shaft and the middle output gear can be integrally formed, which is not limited herein and can be designed according to an actual requirement for arrangement of parts. The vehicle power system 100 is divided into two equal parts along the X axis. The middle input gear of one of the transmission mechanisms and the middle output gear of the other of the transmission mechanisms are located on the same side along the X axis, such as the left part or the right part shown in the figures. As shown in FIG. 4 and FIG. 5, the first middle input gear 211 of the first transmission mechanism and the second middle output gear 222 of the second transmission mechanism are located on the left part along the X axis, and the first middle output gear of the first transmission mechanism and the second middle input gear of the second transmission mechanism are located on the right part along the X axis.

Figure 7:
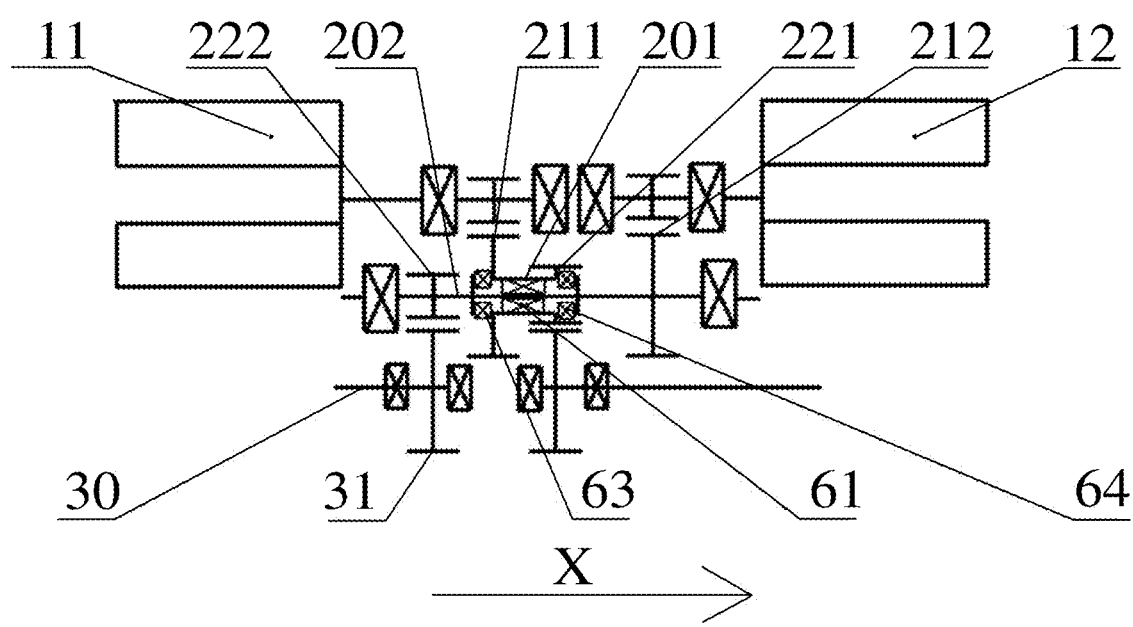
FIG. 7 is a schematic structural diagram of the vehicle power system according to still another embodiment of the present disclosure.
Figure 8:
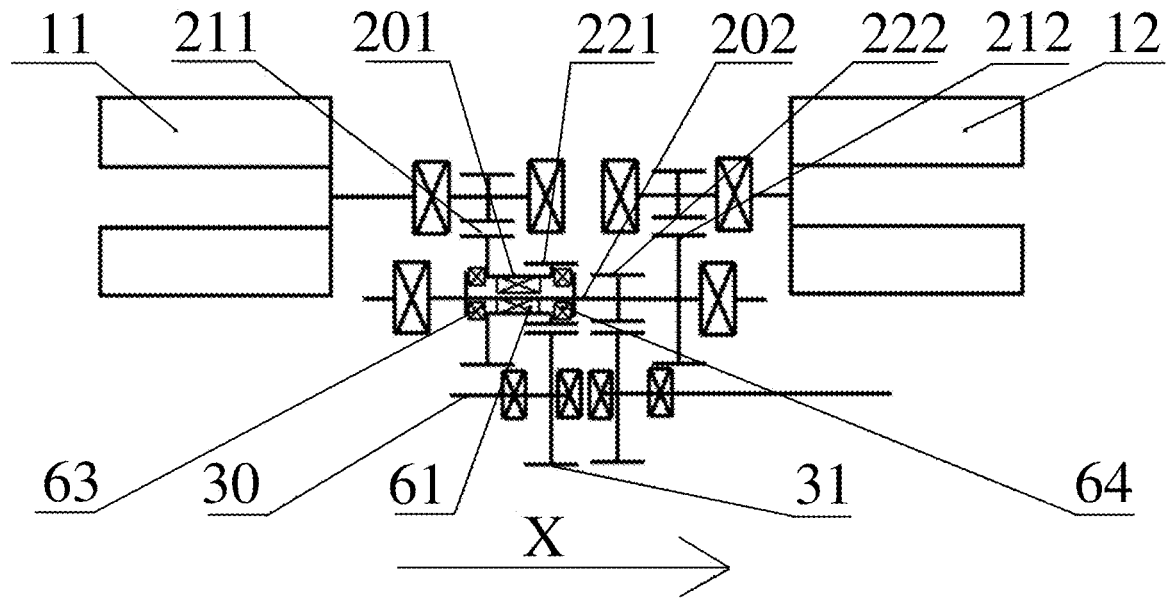
FIG. 8 is a schematic structural diagram of the vehicle power system according to still another embodiment of the present disclosure.

Referring to FIG. 7 and FIG. 8, the two motor output shafts 10 are arranged opposite to each other along the X axis, and the middle transmission gear structures are at least partially overlapped. In an embodiment, the two middle shafts are coaxially nested, and an extending direction of the two power output shafts 30 are defined as a direction of the X axis. The extending direction of the motor output shafts 10 is the same as the direction of the X axis, and the two motor output shafts 10 are arranged coaxially and opposite to each other. From the motor output shafts 10 to the power output shafts 30, the first middle shaft 201 is provided with a through hole, and the second middle shaft 202 passes through the through hole. The two middle input gears are referred as the first middle input gear 211 and the second middle input gear 212. The two middle output gears are defined as the first middle output gear 221 and the second middle output gear 222. The first middle input gear 211 and the first middle output gear 221 are in synchronous transmission connection with each other through the first middle shaft 201, and the second input gear 212 and the second output gear 222 are in transmission connection with each other through the second middle shaft 202. In the present embodiment, the second middle shaft 202 has an end received in the first middle shaft 201. That is, the first middle shaft 201 and the second middle shaft 202 are coaxially nested, and thus an axial length of the transmission mechanism is reduced. The volume of the vehicle power system 100 is reduced and the structure is more compact.

As shown in FIG. 7, the first middle input gear 211 and the first middle output gear 221 are located between the second middle input gear 212 and the second middle output gear 222. It should be noted that, in the present embodiment, since a relative rotating speed between the first middle shaft 201 and the second middle shaft 202 is smaller, the requirement on performance of the bearing are correspondingly lower, and thus needle bearings or thrust bearings can be used, which can reduce the weight of the vehicle power system 100 to a certain extent. In an embodiment, a needle bearing 61 is provided between the first middle shaft 201 and the second middle shaft 201, and a first thrust bearing 63 is provided between the first middle input gear 211 and the second middle shaft 202. In another embodiment, a needle bearing 61 is provided between the first middle shaft 201 and the second middle shaft 201, and a first thrust bearing 63 is provided between the second middle output gear 222 and the second middle shaft 202. In yet another embodiment, a second thrust bearing 64 is provided between the first middle output gear 221 and the second middle shaft 202. In still another embodiment, a second thrust bearing 64 is provided between the second middle input gear 212 and the second middle shaft 202.

Referring to FIG. 8, the vehicle power system 100 is divided into two equal parts along the X axis. The first middle input gear 211 and the first middle output gear 221 are located on the same side of the second middle shaft 202 along the X axis, namely on the left part of the second middle shaft 201 shown in the figure. The second middle output gear 222 and the second middle input gear 212 are located on the other side of the second middle shaft 202 along the X axis, namely on the right part of the second middle shaft 201. A needle bearing 61 is provided between the first middle shaft 201 and the second middle shaft 201. A first thrust bearing 63 is provided between the first middle input gear 211 and the second middle shaft 202, and a second thrust bearing 64 is provided between the first middle output gear 221 and the second middle shaft 202.

Figure 6:
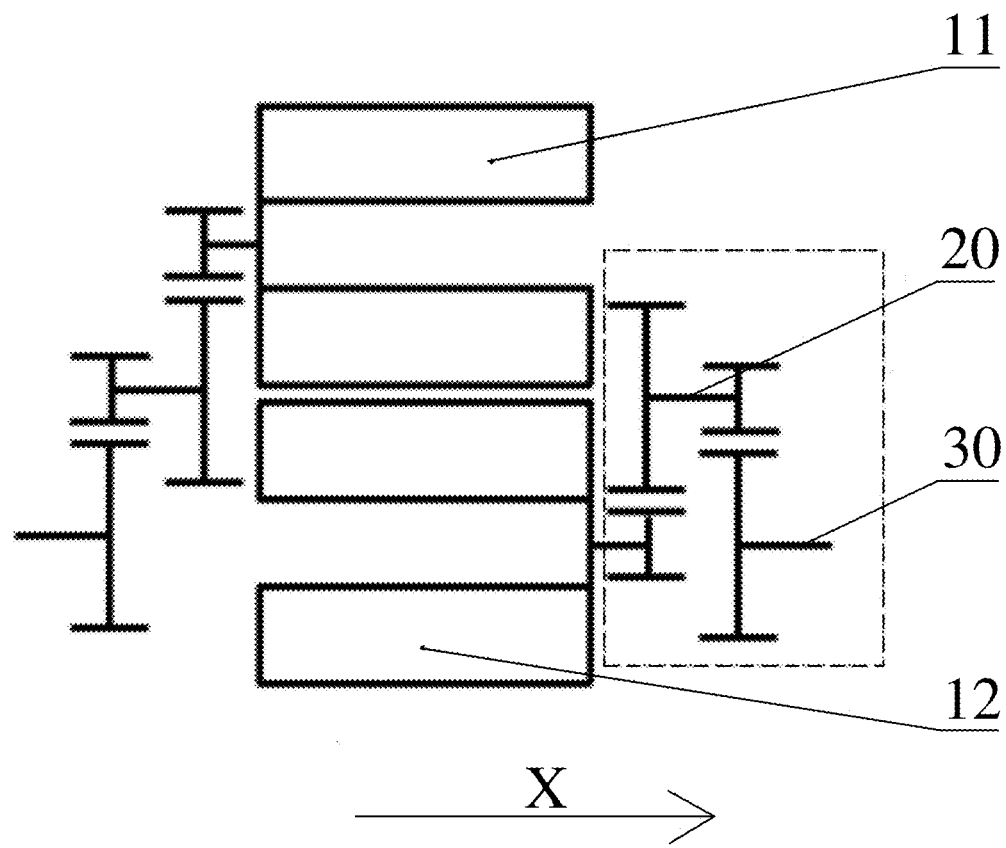
FIG. 6 is a schematic structural diagram of the vehicle power system according to still another embodiment of the present disclosure.

With reference to FIG. 6, the two motor output shafts 10 are perpendicular to the Z axis, and the X axis is perpendicular to the Z axis. Along the Z axis, the two transmission mechanisms are located between the two motor output shafts 10. Along the Z axis, the two middle shafts 20 are located between the two power output shafts 30. Along the X axis, the two motor output shafts 10 are located between the two power output shafts 30. Axes of the two power output shafts 30 are coaxially arranged along the X axis. Axes of the two power output shafts 30 are coaxially arranged and the two power output gears 30 are oppositely to each other.

As shown in FIG. 1, FIG. 2, FIG. 4 and FIG. 5, at least one of the transmission mechanisms includes at least one set of nesting structure, and the nesting structure includes a supporting portion 53, a nesting bearing 52, and a transmission gear. The transmission gear is at least one of the motor output gears 14, the power output gears 31, the middle output gears 22 and the middle input gears 21. The transmission gear is provided with a second mounting cavity 51. At least a portion of the transmission gear is received in the second mounting cavity 51. The transmission gear is supported on the supporting portion 53 through the nesting bearing 52. The supporting portion 53 is a protruding portion of the housing or the supporting portion is fixedly connected to the housing.

Figure 9:
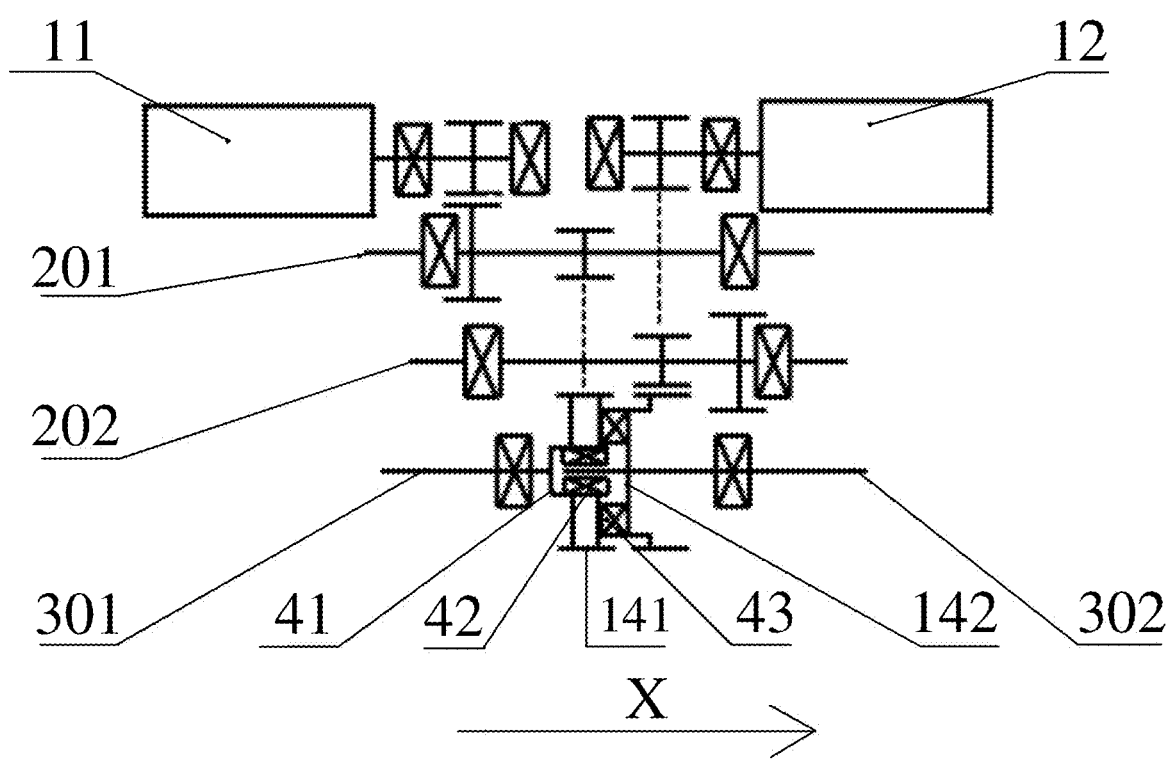
FIG. 9 is a schematic structural diagram of the vehicle power system according to still another embodiment of the present disclosure.

With reference to FIG. 9, at least one group of the two motor output shafts, the two power output shafts, and the two middle shafts are arranged coaxially and opposite to each other. At least a gear at an end of one of the coaxial shafts is provided with a first mounting cavity 41. The transmission system includes a first bearing 42, and at least a portion of the first bearing 42 is located in the first mounting cavity 41. An end of the other of the coaxial shafts is supported by the first bearing.

The above is only an optional embodiment of the present application, and is not therefore limiting the scope of the present application. Any equivalent structural transformation made based on the contents of the specification and drawings of the present application or any direct/indirect application in other related technical fields under the inventive concept of the present application is included in the claimed scope of the present application.

What is claimed is:

1. A vehicle power transmission system, comprising two motor output shafts, two power output shafts, and two transmission mechanisms respectively connected between the two motor output shafts and the two power output shafts correspondingly, wherein each transmission mechanism comprises a motor output gear, a power output gear and a middle transmission gear structure, the motor output gear is arranged on a corresponding motor output shaft, and the power output gear is arranged on a corresponding power output shaft, the middle transmission gear structure is in transmission connection with the motor output gear and the power output gear, and the two power output shafts are extended in a first direction, wherein along the first direction, projections of the two motor output shafts are overlapped; and projections of the two transmission mechanisms are overlapped, the two motor output shafts are perpendicular to a second direction, the first direction is perpendicular to the second direction, each of the middle transmission gear structures comprises a middle shaft, a middle input gear and a middle output gear, the middle input gear and the middle output gear rotate synchronously through the middle shaft, the two transmission mechanisms are located between the two motor output shafts along the second direction, two middle shafts are located between the two motor output shafts along the second direction, the two motor output shafts are located between the two power output shafts along the first direction, axes of the two middle shafts are coaxial along the first direction, axes of the two power output shafts are coaxial, and the two power output gears are opposite to each other.

2. The vehicle power transmission system according to claim 1, wherein:

the two motor output shafts are arranged coaxially and opposite to each other in the first direction;

the two middle transmission gear structures are overlapped, each middle transmission gear structure comprises a middle shaft, a middle input gear and a middle output gear, the middle input gear is synchronous with the middle output gear through the middle shaft;

the two middle shafts are arranged in parallel with the two motor output shafts;

projections of the two middle shafts are overlapped along a direction from the two motor output shafts to the two power output shafts;

projections of the two middle input gears are overlapped along an extending direction of the middle shaft; and the middle input gear and the middle output gear of one of the transmission mechanisms are located on a same side along the first direction, and the middle input gear and the middle output gear of the other of the transmission mechanisms are located on another same side along the first direction.

3. The vehicle power transmission system according to claim 2, wherein the middle shaft is of a split structure, a first portion of the middle shaft is integrally formed with the middle input gear, a second portion of the middle shaft is integrally formed with the middle output gear, and the first portion of the middle shaft is connected to the second portion of the middle shaft through a spline.

4. The vehicle power transmission system according to claim 2, wherein the vehicle power transmission system further comprises a housing;

at least one of the transmission gears comprises at least one set of nesting structure, the nesting structure comprises a supporting portion, a nesting bearing and a transmission gear, the transmission gear is at least one of the two motor output gears, the two power output gears, the two middle output gears and the two middle input gears, the transmission gear is provided with a mounting cavity, at least a portion of the nesting bearing is located in the mounting cavity, the transmission gear is supported on the supporting portion through the nesting bearing, and the supporting portion is a protruding portion of the housing or the supporting portion is fixedly connected to the housing.

5. The vehicle power transmission system according to claim 2, wherein at least one group of the two motor output shafts, the two power output shafts, and the two middle shafts are arranged coaxially and opposite to each other, at least a gear at an end of one of coaxial shafts is provided with a first mounting cavity, the transmission system comprises a first bearing, at least a portion of the first bearing is located in the first mounting cavity, and an end of another of the coaxial shafts is supported by the first bearing.

6. The vehicle power transmission system according to claim 1, wherein:

the two motor output shafts are arranged coaxially and opposite to each other in the first direction;

the two middle transmission gear structures are overlapped, each of the middle transmission gear structures comprises a middle shaft, a middle input gear and a middle output gear, the middle input gear and the middle output gear are rotated synchronously through the middle shaft;

the two middle shafts are arranged in parallel with the two motor output shafts;

projections of the two middle shafts are overlapped along a direction from the two motor output shafts to the two power output shafts;

projections of the two middle input gears are overlapped along an extending direction of the middle shaft; and the middle input gear of one of the transmission mechanisms and the middle output gear of the other of the transmission mechanisms are located on a same side along the first direction.

7. A vehicle power system, comprising:
the vehicle power transmission system according to claim 1; and driving motors, wherein the driving motors are connected to the two motor output shafts or the two motor output shafts are output shafts of the driving motors.

8. The vehicle power system according to claim 7, wherein:

the two motor output shafts are arranged coaxially and opposite to each other in the first direction;

the two middle transmission gear structures are overlapped, each middle transmission gear structure comprises a middle shaft, a middle input gear and a middle output gear, the middle input gear is synchronous with the middle output gear through the middle shaft;

the two middle shafts are arranged in parallel with the two motor output shafts;

projections of the two middle shafts are overlapped along a direction from the two motor output shafts to the two power output shafts;

projections of the two middle input gears are overlapped along an extending direction of the middle shaft; and the middle input gear and the middle output gear of one of the transmission mechanisms are located on a same side along the first direction, and the middle input gear and the middle output gear of the other of the transmission mechanisms are located on another same side along the first direction.

9. The vehicle power system according to claim 8, wherein the middle shaft is of a split structure, a first portion of the middle shaft is integrally formed with the middle input gear, a second portion of the middle shaft is integrally formed with the middle output gear, and the first portion of the middle shaft is connected to the second portion of the middle shaft through a spline.

10. The vehicle power system according to claim 8, wherein the vehicle power transmission system further comprises a housing;

at least one of the transmission gears comprises at least one set of nesting structure, the nesting structure comprises a supporting portion, a nesting bearing and a transmission gear, the transmission gear is at least one of the two motor output gears, the two power output gears, the two middle output gears and the two middle input gears, the transmission gear is provided with a mounting cavity, at least a portion of the nesting bearing is located in the mounting cavity, the transmission gear is supported on the supporting portion through the nesting bearing, and the supporting portion is a protruding portion of the housing or the supporting portion is fixedly connected to the housing.

11. The vehicle power system according to claim 8, wherein at least one group of the two motor output shafts, the two power output shafts, and the two middle shafts are arranged coaxially and opposite to each other, at least a gear at an end of one of coaxial shafts is provided with a first mounting cavity, the transmission system comprises a first bearing, at least a portion of the first bearing is located in the first mounting cavity, and an end of another of the coaxial shafts is supported by the first bearing.

12. The vehicle power system according to claim 7, wherein:

the two motor output shafts are arranged coaxially and opposite to each other in the first direction;

the two middle transmission gear structures are overlapped, each of the middle transmission gear structures comprises a middle shaft, a middle input gear and a middle output gear, the middle input gear and the middle output gear are rotated synchronously through the middle shaft;

the two middle shafts are arranged in parallel with the two motor output shafts;
projections of the two middle shafts are overlapped along a direction from the two motor output shafts to the two power output shafts;
projections of the two middle input gears are overlapped along an extending direction of the middle shaft; and
the middle input gear of one of the transmission mechanisms and the middle output gear of the other of the transmission mechanisms are located on a same side along the first direction.

* * * * *